Nov. 18, 1969　　　　J. W. GOSS　　　　3,478,997
MIRROR HANGER AND MOLDING COMBINATION
Filed Nov. 30, 1967　　　　2 Sheets-Sheet 1

INVENTOR.
*James W. Goss*
BY
*Frease & Bishop*
ATTORNEYS

Nov. 18, 1969

J. W. GOSS 3,478,997

MIRROR HANGER AND MOLDING COMBINATION

Filed Nov. 30, 1967

INVENTOR.
James W. Goss

BY

Frease & Bishop
ATTORNEYS

United States Patent Office 3,478,997
Patented Nov. 18, 1969

3,478,997
MIRROR HANGER AND MOLDING COMBINATION
James W. Goss, 410 South St. SW.,
Warren, Ohio 44483
Filed Nov. 30, 1967, Ser. No. 687,044
Int. Cl. A47g 1/04
U.S. Cl. 248—488                                4 Claims

ABSTRACT OF THE DISCLOSURE

A mirror hanger and molding combination having similar horizontally disposed upper and lower molding strips. Each molding strip comprises a channel portion open toward the other to receive the adjacent edge portion of the mirror, and a rearwardly offset flange adapted to be attached to a wall or similar supporting surface. Beads are formed in the inner surfaces of the channel portion a plastic spacer block is located in the lower channel to support and cushion the lower edge of the mirror, and plastic moisture seal strips are inserted between the mirror and the outer wall of each channel. An end cap is connected to each end of each molding strip. Each end cap has two tongues, one inserted between the channel portion of the molding and the wall, and the other inserted between the rearwardly offset attaching flange and the back of the mirror.

BACKGROUND OF THE INVENTION

Field of the invention

The invention relates to means for supporting a mirror upon a wall, or other vertical surface, and more especially to a mirror hanger and molding combination comprising similar horizontally disposed upper and lower molding strips each having a channel portion open toward the other for receiving the adjacent edge portion of the mirror, and a rearwardly offset attaching portion for attaching the same to the wall or other support.

Description of the prior art

Attempts have been made to provide mirror supports of this general character but so far as is known none of them has been completely satisfactory for the purpose intended because they provide no cushioning means in the channel of the lower molding member for supporting the lower edge of the mirror; no inwardly disposed beads in the channel portion for holding the mirror out of contact with the adjacent inner wall of the channel portion and no moisture seal strips for insertion between the front surfaces of the mirror and the front leg of the channel portion for supporting the mirror moisture-proof and rattle-proof.

SUMMARY OF THE INVENTION

The invention may be briefly described as comprising upper and lower horizontal molding strips which may be extruded from aluminum or the like. These molding strips are identical excepting that they are reversed in position. The lower molding strip comprises an upwardly open channel portion for receiving the lower edge of the mirror and a rearwardly offset, upwardly disposed attaching flange for attaching the same to a wall or other vertical support.

The upper molding strip is inverted with the channel portion opening downwardly to receive the upper edge portion of the mirror and the rearwardly offset attaching flange is downwardly disposed. A spacer block of plastic or the like is located in the channel of the lower molding strip to support and cushion the lower edge of the mirror.

Inwardly disposed beads are provided on the inner surfaces of the channel portions. These beads serve several purposes; in the lower molding strip the beads position the spacer block at the bottom of the channel; the beads on the rear legs of both the upper and lower channels engage the adjacent edge portions of the back of the mirror and hold the remainder of the back of the mirror away from contact with the adjacent wall of the channel; and one bead at the edge of the front leg of each channel member serves to position a moisture seal strip of plastic, rubber or the like between the front of the mirror and the front leg of the channel, to provide a moisture-proof and rattle-proof mirror mounting.

End caps are provided for the ends of the molding strips, each end cap conforming substantially to the cross-sectional shape of the molding strip and having spaced, staggered tongues, one for insertion between the wall and the back leg of the channel portion and one for insertion between the rearwardly offset attaching flange and the back of the mirror.

These end caps are made in lefts and rights. The end cap which fits the right hand end of the lower molding strip will fit the left hand end of the upper strip and the end cap which fits the left hand end of the lower strip will fit the right hand end of the upper strip.

An object of the invention is to provide a mirror hanger and molding combination comprising a lower molding strip having an upwardly open channel portion for receiving and supporting the weight of a mirror and a rearwardly offset, upwardly disposed attaching portion for attachment to a wall or other vertical support, a similar upper molding strip having a downwardly open channel portion for receiving the upper edge portion of the mirror and a rearwardly offset, downwardly disposed, attaching flange for attachment to the wall, there being beads on the inner walls of the channel portions of the molding strips for contacting the adjacent edge portions of the mirror and preventing the remainder of the mirror from contacting the inner walls of the channel portions.

Another object is to provide such a mirror hanger and molding combination in which a spacer block of plastic material or the like is located in the channel of the lower molding strip for supporting and cushioning the mirror.

A further object of the invention is to provide a mirror hanger and molding combination of the character referred to having flexible moisture seal strips of plastic material or the like inserted between the front leg of each channel and the adjacent front surface of the mirror.

A still further object of the invention is to provide a mirror hanger and molding combination of this type having end caps detachably connected to the ends of the molding strips.

It is also an object of the invention to provide such a mirror hanger and molding combination in which each end cap has a spaced pair of staggered tongues one of which is inserted between the wall and the rear leg of the channel portion, the other tongue being inserted between the attaching flange and the rear surface of the mirror.

The above objects together with others which will be apparent from the drawings and following description, or which may be later referred to, may be attained by constructing the improved mirror hanger and molding in the manner hereinafter described in detail and illustrated in the accompanying drawings.

BRIEF DESCRIPTION OF THE DRAWINGS

FIG. 1 is a perspective front view of a mirror hanger and molding combination embodying the invention, showing a mirror mounted therein;

FIG. 2 is a fragmentary front elevation of one end portion of the device shown in FIG. 1, with parts broken away for the purpose of illustration;

FIG. 3 is an end view of the mirror hanger and molding combination shown in FIG. 2;

FIG. 4 is an enlarged fragmentary, transverse sectional view taken on the line 4—4, FIG. 2;

DESCRIPTION OF THE PREFERRED EMBODIMENT

Figure 5:
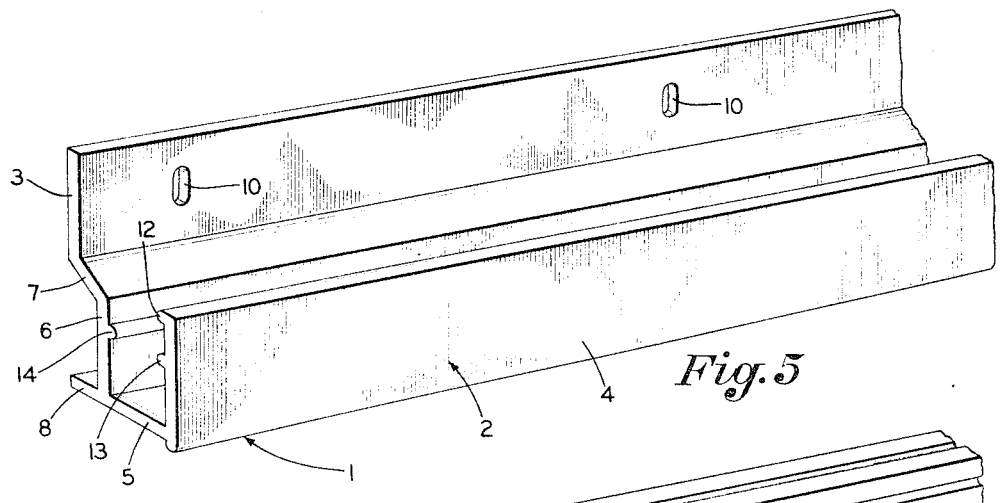
FIG. 5 is an enlarged perspective view of a portion of the improved molding strip forming a part of the invention.
Figure 6:
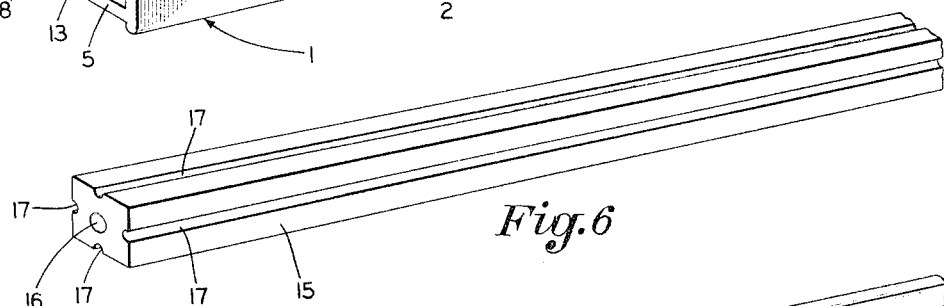
FIG. 6 is a similar view of the plastic spacer block.
Figure 7:
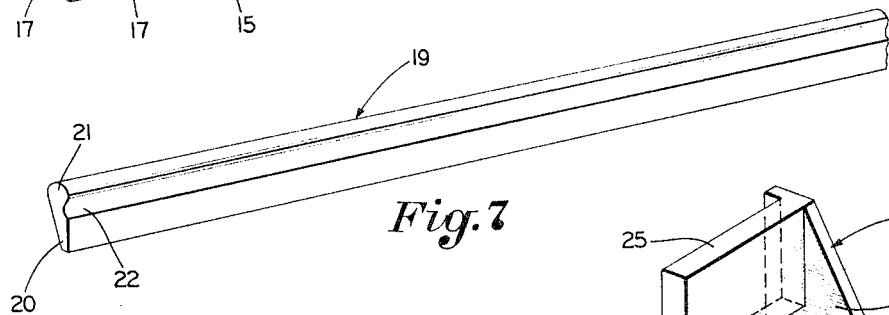
FIG. 7 is a similar view of a portion of one of the moisture seal strips.

Referring now more particularly to the construction illustrated in the drawings, in which similar numerals refer to similar parts throughout, the improved molding strip which is indicated generally at 1 is shown in detail in FIG. 5. This molding strip is preferably extruded from aluminum or similar material and includes a channel portion indicated generally at 2 and a rearwardly offset attaching flange 3.

The channel portion 2 comprises the front leg 4, the bottom wall 5 and the rear leg 6. The rearwardly offset attaching flange 3 is integrally connected to the rear leg 6 as by the angular flange 7. The bottom wall 5 may have an extension 8 adapted to contact the wall 9 as best shown in FIG. 4.

For the purpose of connecting the attaching flange 3 to the wall or other vertical support, spacer apertures 10 may be formed therein for receiving screws 11. The apertures 10 are preferably vertically disposed elongated slots so that each molding strip may be properly leveled as it is attached to the wall by the screws 11.

A longitudinally disposed bead 12 is formed on the inner surface of the front leg 4 of the channel, at the edge thereof, and at a point spaced from the bottom wall 5 of the channel a pair of similar beads 13 and 14 are formed on the inner surfaces of the front and rear walls 4 and 6, respectively.

Figure 9:
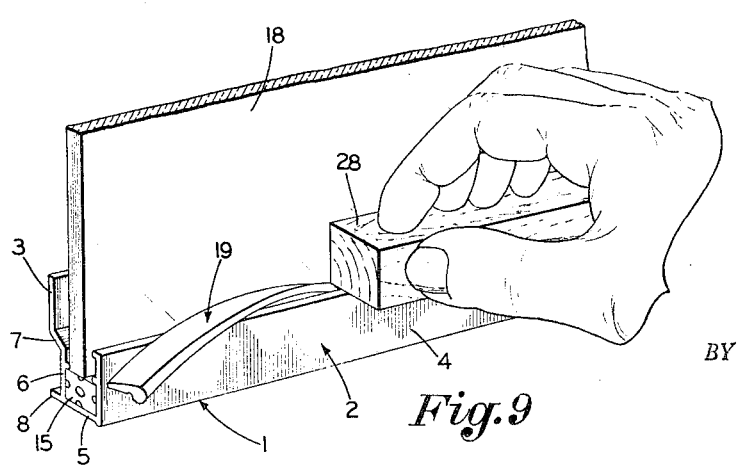
FIG. 9 is a fragmentary perspective view showing the manner in which the moisture seal strips may be inserted between the front leg of the channel and the inner surface of the mirror.

A spacer block 15, formed of suitable plastic material, is located in the bottom of the channel portion 2 of the lower molding strip, as shown in FIGS. 1, 4 and 9. This spacer block is substantially rectangular in cross section and is of suitable width to fill the channel between the front and back walls 4 and 6, and between the beads 13 and 14 and the bottom wall 5, as best shown in FIG. 4.

The spacer block preferably has a central, longitudinally disposed groove 17 in each of the four outer surfaces. As best shown in FIGS. 1, 4 and 9, the lower edge of the mirror 18 is cushioned and supported upon the plastic spacer block 15, the lower edge portion of the inner surface of the mirror contacting the bead 14, which spaces the rear surface of the mirror from the inner wall of the rear leg 6 of the channel.

As seen in FIG. 1, the rear surface of the upper edge of the mirror contacts the bead 14 on the rear leg of the channel of the upper molding strip spacing the upper portion of the back of the mirror away from the inner surface of the rear leg 6 thereof.

Moisture seal strips, indicated generally at 19, formed of plastic or other suitable flexible material, are inserted between the front leg 4 of the channel portion of each molding strip and the adjacent portion of the inner surface of the mirror, as best shown in FIG. 4.

Each moisture seal strip 19 includes the tapered portion 20, for insertion between the front leg of the channel and the outer surface of the mirror, and the enlarged nose 21 between which is formed a longitudinal groove 22 which receives the bead 12 at the edge of the front leg 4 of the channel.

These moisture seal strips also act as flexible wedges to wedge the adjacent edge portions of the mirror against the adjacent beads 14 on the rear legs 6 of the channel portions, thus holding the mirror snugly in place within the molding strips.

For the purpose of closing the ends of the molding strips to provide a finished appearance, end caps may be provided such as indicated generally at 23 in FIGS. 2, 3, 4 and 8. Each end cap is made up of the plate 24, shaped to cover the end portions of the molding strip, and the pair of spaced, staggered tongues 25 and 26.

The tongue 25 is inserted between the attaching flange 3 and the rear side of the mirror and the tongue 26 is inserted between the wall and the rear leg 6 of the channel portion, as best shown in FIG. 4.

An aperture 27 may be formed in each end cap to register with the aperture 16 in the spacer block. These end caps are made in rights and lefts. The end cap shown in FIG. 8 will fit the right hand end of the lower molding strip and the left hand end of the upper molding strip.

Figure 8:
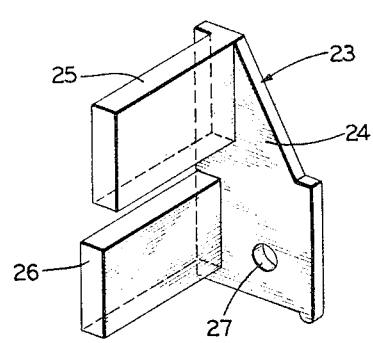
FIG. 8 is an enlarged perspective view of one of the end caps.

The end cap made to fit the left hand end of the lower molding strip and the right hand end of the upper molding strip will be in reverse of that shown in FIG. 8, the tongues 25 and 26 being connected to the other side of the plate 24.

OPERATION

After determining the desired location for the mirror, a horizontal line is drawn where the bottom of the lower molding strip is to be positioned. Depending upon the height of the molding strip, measure up from this line and draw a second horizontal line. Determine the center of the mirror location and draw a vertical line. It should be understood that in order that the mirror be properly mounted, a level should be used for drawing all of these lines.

Then measure upon from the second horizontal line the height of the mirror minus the distance between the first and second horizontal lines, and draw a third horizontal line. Measure and mark the center of both molding strips.

Then measure the distance from the center of the lower molding strip to one of the screw holes 10. Then measure the same distance from the center line on the wall and mark on the second horizontal line. Then drill holes in the wall for the screws and secure the bottom molding strip to the wall with screws 11, using a level so that the molding strip is perfectly horizontal.

Then draw a fourth horizontal line on the wall the same distance above the third horizontal line as the distance between the first and second horizontal lines and repeat the above steps for securing the upper molding strip to the wall.

Then insert the spacer block 15 in the channel portion 2 of the lower molding strip making sure that it is all the way down to the bottom of the channel portion. Then insert the upper edge of the mirror into the channel portion of the top molding strip, pushing it up as far as possible, and then gently lower the bottom edge of the mirror into the channel portion of the lower molding strip to the position best shown in FIGS. 1 and 4, with the lower edge of the mirror supported and cushioned upon the spacer block 15.

Then, using a small wooden block as indicated at 28 in FIG. 9, press the moisture seal strips 19 between the front legs 4 of the channel portions of the top and bottom strips and the adjacent portion of the front surface of the mirror, to the position shown in FIGS. 1 and 4, pressing the upper and lower edges of the mirror against the beads 14 on the inner surfaces of the rear legs 6 of the channel portions of the molding strips.

The installation is thus complete with the mirror resting upon the spacer block and rattle-proof and moisture-proof with the moisture seal strips in place.

In the foregoing description certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

I claim:

1. In a mirror hanger and molding combination, top and bottom molding strips each having front and rear surfaces and provided adjacent said front surfaces thereof with channels which face toward each other, and which are respectively adapted to receive therein the top and bottom edges of a mirror, each channel including a front leg, a bottom wall and a rear leg, bottom mounting means located above and rearwardly of the channel in said bottom molding strip, and including a rearwardly offset upwardly extending attaching flange on said bottom molding strip above and rearwardly of said channel therein, for securing said bottom molding strip to a wall or the like, top mounting means located below and rearwardly of the channel in the top molding strip and including a rearwardly offset downwardly extending attaching flange on said top molding strip below and rearwardly of said channel therein, the improvement which comprises a bead on the inner surface of the edge portion of the front leg of each channel, a bead on the inner surface of the rear leg of each channel midway between the top and bottom of the channel, and flexible moisture seal strips located between the front leg of each channel and the adjacent front surface of the mirror, each moisture seal strip engaging the corresponding first named bead and pressing the rear surface of the adjacent edge portion of the mirror against the corresponding second named bead, an end cap for each end of each molding, each end cap comprising a plate shaped to cover the adjacent end of the molding strip, and angular tongues upon said plate, one tongue being inserted between the wall and the rear leg of the channel and the other tongue being received between the attaching flange and the mirror.

2. In a mirror hanger and molding combination as defined in claim 1, a bead on the inner surface of the front leg of the channel of each molding strip opposite to said second named bead, said third named beads limiting the inner movement of said moisture seal strips.

3. In a mirror hanger and molding combination as defined in claim 1, a bead on the inner surface of the front leg of the channel of the bottom molding strip opposite to said second named bead, and a flexible spacer block located in the channel of said bottom molding strip between said second named and third named beads and the bottom wall of said channel, the lower edge of the mirror resting upon said spacer block.

4. In a mirror hanger and molding combination as defined in claim 3, said spacer block having a longitudinal aperture therein, the end caps on the bottom molding strip having apertures therein registering with the aperture in the spacer block.

References Cited

UNITED STATES PATENTS

| | | | |
|---|---|---|---|
| 2,727,272 | 12/1955 | Hankin et al. | 248—201 X |
| 3,078,608 | 2/1963 | Diack | 248—488 X |
| 3,158,909 | 12/1964 | Downs | 52—403 X |
| 3,333,382 | 8/1967 | De Ridder | 52—403 X |

ROY D. FRAZIER, Primary Examiner

F. DOMOTOR, Assistant Examiner

U.S. Cl. X.R.

40—152; 52—397, 494; 248—201